United States Patent [19]

Kromrey

[11] Patent Number: 4,772,521
[45] Date of Patent: Sep. 20, 1988

[54] SOLID FLOWABLE POLYMER MEDIUM WITH METAL ADDITIVES AND METHOD OF MOLDING USING SAME

[75] Inventor: Robert V. Kromrey, Campbell, Calif.

[73] Assignee: United Technologies Corporation, Hartford, Conn.

[21] Appl. No.: 130,600

[22] Filed: Dec. 9, 1987

Related U.S. Application Data

[62] Division of Ser. No. 907,943, Sep. 10, 1986, Pat. No. 4,755,343.

[51] Int. Cl.⁴ ............................ B32B 5/16; B32B 9/00
[52] U.S. Cl. .................................... 428/402; 428/323; 428/327; 428/328; 428/331; 428/357; 528/32
[58] Field of Search ............... 428/402, 323, 327, 331, 428/328, 357; 528/32

[56] References Cited

U.S. PATENT DOCUMENTS 4,011,929  3/1977  Jeram et al. ............................ 528/32
4,704,240  11/1987  Reavely et al. ...................... 264/257

*Primary Examiner*—Sharon A. Gibson

[57] ABSTRACT

A flowable particulate polymer-metal mixture that is thermally conductive and is particularly adapted for use as a pressurizing medium in a high pressure elevated temperature molding process. The material comprises a substantially uniform mixture of about 20% to about 90% solid flowable, particulate silicone rubber having a nominal flow rate of at least 0.6 gram/second through a 1.1 cm diameter pipe 7.6 cm long under applied pressure of 10.34 MPa at room temperature. The material also comprises about 10% to about 80% thermally conductive particulate metal that has a melting point less than the molding temperature and is substantially chemically compatible with said silicone rubber. The pressurizing medium is used to mold article precursors into articles by placing an article precursor within a pressure vessel and substantially filling the vessel with a pressurizing mixture. The mixture is exposed to a temperature equal to or greater than the metal melting point and is caused to produce a substantially uniform predetermined medium pressure on the surface of the article precursor to mold the article. The molten metal transfers heat to the article precursor yet since it is molten the polymer-metal mixture is flowable.

4 Claims, 1 Drawing Sheet

U.S. Patent
Sep. 20, 1988
4,772,521
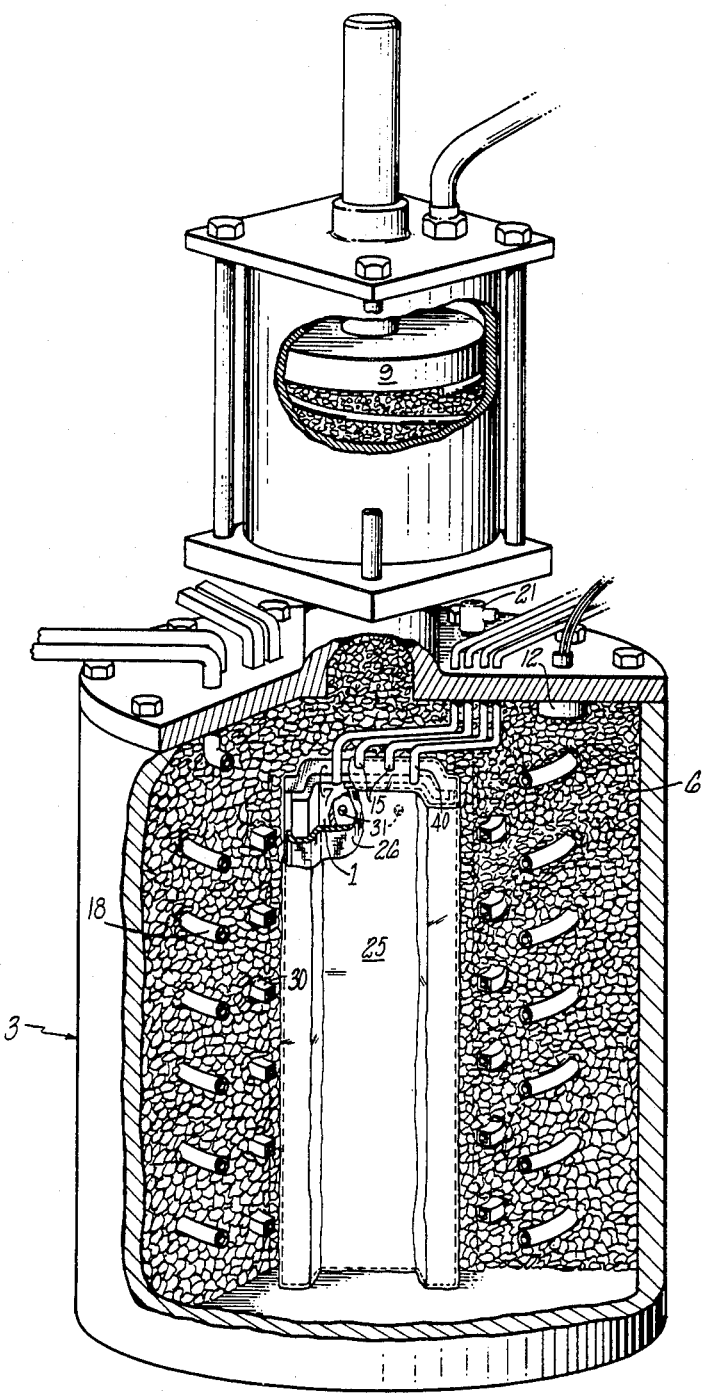

SOLID FLOWABLE POLYMER MEDIUM WITH METAL ADDITIVES AND METHOD OF MOLDING USING SAME

CROSS REFERENCE

This is a division of application Ser. No. 907,943, filed on Sept. 10, 1986, now U.S. Pat. No. 4,755,343.

This application relates to commonly assigned copending applications Ser. Nos. 829,048 filed Feb. 13, 1986, entitled "Molding Method and Apparatus Using a Solid, Flowable, Polymer Medium"; 907,959 filed Sept. 10, 1986, entitled "Solid Flowable Polymer Molding Medium"; 907,947 filed Sept. 10, 1986, entitled "Method for Molding Using a Dual Solid Flowable Polymer System"; 907,946 filed Sept. 10, 1986 entitled "High Temperature Solid Flowable Polymer Medium and Method of Molding Using Same"; 907,942 filed Sept. 10, 1986, entitled "Method for Molding a Carbon-Carbon Composite"; 907,952, filed Sept. 10, 1986, entitled "Method for Recovering a Solid Flowable Polymer Medium"; 907,955, filed Sept. 10, 1986, entitled "Solid Flowable Medium Having a Thermal Stability Additive and Method for Molding Using Same"; 907,958, filed Sept. 10, 1986, entitled "Method of Vacuum Bagging Using a Solid Flowable Polymer"; 907,954, filed Sept. 10, 1986, entitled "Improved Method of Fabricating Tubular Composite Structures; and 907,957, filed Sept. 10, 1986, entitled "Solid Flowable Polymer Medium with U.V. Detectable Additive and Method for Molding Using Same", filed on even date herewith, which disclose material related to that contained herein, the disclosures of which are hereby incorporated by reference.

DESCRIPTION

1. Technical Field

The present invention relates to molding methods and compositions and specifically to a composition useful for molding articles under pressure.

2. Background Art

Composite materials are of great current interest because they provide a very favorable combination of high strength and low density. Typically, a composite material is comprised of fibers of graphite, boron, glass, and the like embedded within an epoxy, phenolic or other polymer resin matrix. The more advanced composites which have particularly favorable high strength to density ratio properties are especially attractive for aerospace applications. But typical of other advanced aerospace materials they present comparative processing difficulties; they cannot be made by a simple layup of the fibers and resin followed by room temperature curing. Aerospace composite materials not only involve more difficult-to-fabricate resins but often essentially defect-free finished parts must be produced. As a result, aerospace composites are typically molded and cured at elevated temperatures under substantial pressure.

One method of molding (pressure pads) comprises using shaped pads of a high thermal expansion silicone rubber. An uncured prepreg is contained within a space between abutting adjacent pads and the assembly is captured in a closely fitting closed metal vessel. The vessel and contained assembly are then heated to an elevated temperature to both cure the article and expand the rubber to apply pressure to the article during its cure. The pressure pads are also referred to as trapped rubber tooling.

A high degree of thermal conductivity is often desired in trapped rubber tooling. The increased conductivity permits more rapid heating of articles during pressurization. Aluminum powder is generally used because it has good thermal conductivity properties, is low in density, and is low in cost. Metal additives, however, lower the amount of polymer in the compound with consequent lower thermal expansion capability. The metal also increases the hardness of the tooling rubbers reducing its compliance to irregular articles under pressure.

Although a variety of molding processes have been used to mold composites at elevated temperatures and pressures (e.g. compression molding, isostatic pressure molding using pressure bags or pressure vessels, pressure pad molding) there are problems (e.g. bag leaks) associated with these processes.

Accordingly, there is a constant search for composite molding processes that are not subject to pressure loss if minor flaws occur in the barrier between the pressurant and the article.

DISCLOSURE OF INVENTION

The disclosure is directed to a flowable particulate polymeric metal mixture that is thermally conductive and is particularly adapted for use as a pressurizing medium in a high pressure, elevated temperature molding process. The material comprises a substantially uniform mixture of about 20% to about 90% solid flowable, particulate silicone rubber having a nominal flow rate of at least 0.6 gram/second through a 1.1 cm diameter pipe 7.6 cm long under applied pressure of 10.34 MPa at room temperature. The material also comprises about 10% to about 80% thermally conductive particulate metal that has a melting point less than the molding temperature to be used and is substantially chemically compatible with said silicone rubber.

Another aspect of this invention relates to a method of molding an article precursor into an article at an elevated temperature using a pressurizing medium that by virtue of its particulate metal transfers heat to the article precursor. The method comprises placing an article precursor within a pressure vessel and substantially filling the vessel with a substantially uniform mixture. The mixture comprises a solid flowable polymer medium and thermally conductive particulate metal having a melting point less than about said elevated temperature. The particulate metal is also substantially chemically compatible with said polymer. The mixture is exposed to a temperature equal to or greater than the metal melting point and is caused to produce a substantially uniform predetermined medium pressure on the surface of said article precursor.

This invention makes a significant advance in the field of molding by providing a pressurizing medium that is thermally conductive yet flowable.

The foregoing and other objects, features and advantages will be apparent from the specification, claims and from the accompanying drawings which will illustrate an embodiment of the invention.

BRIEF DESCRIPTION OF DRAWING

The FIGURE shows a perspective view cutaway of an apparatus for performing the molding method of the present invention by controlling the temperature of the polymer medium metal mixture by heating means and optionally controlling the pressure on the article to be molded by a mechanical means such as a piston.

BEST MODE FOR CARRYING OUT THE INVENTION

The particular polymeric medium metal mixture useful in the present invention is a critical component to the invention. Its responsiveness to temperature and pressure coupled with its flowability and solid nature at molding temperatures enable it to be useful. These properties cause the medium to produce an advantageous, substantially uniform, controllable pressure on the surface of the article precursor. In a typical embodiment of the invention, the polymer is an unfilled silicone rubber particulate of −4 +30 U.S. mesh sieve size (4.7–0.42 millimeter (mm)), which when pressurized, is sufficiently self-compliant to coalesce as an essentially void-free medium at a pressure of the order of 69 kiliPascals (kPa) (10 pounds per square inch (psi)).

Typically, a silicone rubber is used as the pressurizing polymer. Most preferably, the rubber is an improvement on the type which is described in U.S. Pat. No. 3,843,601 to Bruner. See also U.S. Pat. No. 4,011,929 to Jeram et al. The disclosures of both patents are hereby incorporated by reference. Generally, the preferred materials are dimethylsilicones that have vinyl groups. They may be produced by conventional commercial procedures, including production from polysiloxanes using various vulcanizing techniques. A preferred material which has been used thus far is the experimental unfilled silicone rubber material designated as X5-8017, formerly No. 6360 81 (more simply 8017 hereinafter), by the Dow Corning Corporation (Midland, Mich.).

Another Dow Corning silicone rubber, No. 93-104, without its ordinary fillers (called "93-104" herein, nonetheless) is useful. The Polygel C-1200 silicone rubber (Stauffer Chemical Company, Westport, Conn.), believed to be essentially the material which is described in the Bruner U.S. Pat. No. 3,843,601 is also useful with the present invention.

Other preferred materials are the vinylmethylsiloxane-dimethylsiloxane (VMS-DMS) polymers such as Dow Corning No. X5-8026 as described in commonly assigned copending application Ser. No. 907,946, filed Sept. 10, 1986, entitled "High Temperature Solid Flowable Polymer Medium and Method of Molding Using the Same", the disclosure of which is hereby incorporated by reference as it is usable at high temperatures (e.g. 316 degrees centigrade (°C.) (600° F.), 482° C. (900° F.)).

While the preferred materials are silicone rubbers, other polymer materials having the desired characteristics can be used. Most silicone rubbers are temperature limited for long term use, e.g. typically up to about 232° C. (450° F.). However, silicone resins of the vinlymethylsiloxane and silphenylene types have been successfully tested up to about 482° C. (900° F.). Fillers and other adulterants (such as the metal particulates described below) can be included with and within the medium, provided the essential behavior properties are maintained.

The thermally conductive particulate additives used to increase heat transfer within the polymer itself and to the article to be molded yet not detract from the polymer properties described below comprise particulate metal. By thermally conductive is meant having a conductivity typical of metals and alloys which is greater than that of organic materials. By particulate is meant particles less than about 0.5 mm in size. These sizes enable the metal to mix with the polymer so as to provide a uniform mixture. This aids in increasing the heat transfer as the heat transferring metal is distributed throughout the mixture. It is especially preferred that the particulate metal is about 0.005 mm to about 0.5 mm. If the particles are below about 0.005 mm in size, they may tend to oxidize rapidly. In addition, it is preferred that the particles are smaller or equal to the average size of the polymer particles in order that the molten metal can flow around the polymer particle and join with other metal particles. Larger sizes will remain as discrete particles and that will reduce conductivity (as compared to properly dispersed particles) as they may not contact one another.

Virtually any metal or combination (e.g. alloy) can be used that has a melting point less than about the temperature at which the article is to be molded. The melting point of the metal is preferably low enough to allow flow of the medium during the initial preforming cycles and during the temperature ramping steps. This is critical because the metal particulate should not provide structure to the polymer-metal mixture medium during molding. This would detract from the flowable nature of the medium which is critical to the invention as described below. In fact, in the molten state, the metal tends to act as a lubricant between the individual polymer particles and at the least, does not inhibit the medium flow. Preferred alloys comprise lead, tin, zinc and bismuth actually enhance the flowable nature of the medium. Thus, the heat transfer nature of the polymer is improved without loss of flow properties. Typically, the melting point is below about 232° C. (450° F.) as above that temperature, the metal will provide too much structure during the initial preforming and curing stages. Of course this will vary with the molding temperature required to mold an article. For example, 177° C. (350° F.) epoxy resins, the melting point is preferably below about 121° C. (250° F.). For polyimide resins cured at or below 316° C. (600° F.), the metal preferably melts at approximately 171° C. (340° F.).

It is believed the molten metal conforms to the irregular surface of the particulate polymer medium. This results in a continuous film of metal surrounding every polymer particle thereby enhancing thermal conductivity. It is believed that the metal-medium mixture when hot, is more mobile than the properties of the medium alone in the cold state.

The metal or alloy chosen is also substantially chemically compatible with the polymer chosen. By substantially chemically compatible is meant that it does not accelerate reversion (breakdown) or decomposition of more than about 10% of the polymer medium under the molding temperature used. Reversion refers to the "depolymerization" of the medium to an oily viscous liquid medium or gasification. If the metal is not chemically compatible, excessive destruction of the medium may occur.

In addition, it is especially preferred that the metal or alloy chosen has high thermal conductivity, a low specific heat, a low density, a low melt viscosity and a low surface tension as this combination of properties provides the most desirable molding metal-medium.

It is preferred that the particulate metal comprises eutectic alloys. Preferred materials include those described in the Table below, however, there are generally many alloys of copper, lead, tin and bismuth that are believed suitable. Many of the pure metals are available from Atlantic Equipment Engineers (Bergenfield, N.J.).

TABLE

| Metal Matrices | | | |
|---|---|---|---|
| | Melting Point | Elements | Ratios |
| Ternary Eutectic | 95° C. | Bi, Pb, Sn | 52.5:32:15.5 |
| Roses Metal | 109° C. | Bi, Pb, Sn | 50:28:22 |
| Ternary Eutectic | 130° C. | Bi, Sn, Zn | 56:40:4 |
| Binary Eutectic | 140° C. | Bi, Sn | 58:42 |
| Eutectic Solder | 183° C. | Sn, Pb | 63:37 |
| Binary Eutectic | 198° C. | Sn, Zn | 96.5:3.5 |

It is preferred that the mixture of polymer and particulate metal comprises about 20% to about 90% polymer and about 10% to about 80% particulate metal. This is because above about 90% excess metal will squeeze out of the polymer and below about 10%, there will be insufficient metal to form the continuous layer necessary for improved heat transfer. The density of the metal used will also affect the degree of "squeeze out". The percentage of metal is dependent on molding pressure as it is believed higher pressures tend to squeeze the metal into thinner layers around the polymer particles. Also, the higher the specific gravity of the metal, the more the metal will tend to stratify, which is not desired. It is especially preferred that if the polymer is the Bi-Pb-Sn ternary eutectic described in the Table above the particulate metal mixture comprises about 25% to about 40% polymer and about 60% to about 75% particulate metal. The ternary eutectic is useful for low temperature composites (e.g. up to 232° C. (450° F.)). Another preferred material is the eutectic solder described above as it is useful for higher temperatures (e.g. 316° C. (600° F.) to 399° C. (750° F.). Although the mixture has been described in terms of percentage compositions, mixtures that vary from these but provide the advantages described herein may be used.

Depending on the polymer used in the mixture, the polymer and metal may be separated after use facilitating reuse of the polymer as is described in commonly assigned copending application Ser. No. 907,943, filed Sept. 10, 1986, entitled "Method for Recovering a Solid Flowable Polymer Medium", the disclosure of which is hereby incorporated by reference. For example, typically the polymer has a specific gravity less than about 1 whereas the metallic particles have a specific gravity greater than about 3. Because of the differential specific gravities a water wash (preferably with detergent in order to float and clean the polymer) effectively separates the polymer from the metal. In most instances, the mixture can be immediately reused after suitable drying operations. This facilitates reuse of the materials if they become contaminated.

Having described the metal particles and the proportion of metal to polymer particles, the polymers used in this invention are further described below.

The preferred 8017 silicone rubber is characterized by low strength and high friability. By "high friability" is meant there is such low strength that moderate size solids tend to disintegrate into smaller particulates when subjected to modest mechanical forces, even rubbing between the fingers. The 8017 material has a Shore A hardness of less than 1 (Shore 00 hardness of 50-55) and compressive strength of the order of 70 kPa when measured on a 2.5 centimeters (cm) square by 1.27 cm thick specimen, and upon a compression deformation of about 40%, it shears into smaller particles. This behavior is contrasted with that of more conventional rubbers which have higher strength, greater resistance to deformation and greater elongation to failure. It has also been observed that preferred polymer useful with the present invention forced through a small orifice, or through a 1.1 cm diameter pipe as described below, has a tendency to disintegrate into smaller particulate. By example, it is found that over time a nominal 30 mesh size powder having about 50 weight percent retained on a 40 mesh screen will change to one having only about 25 weight percent retained on 40 mesh.

The aforementioned behavior of the polymer enables the fabrication of intricately shaped composite polymer parts with uniform properties under the controlled and independent application of substantially uniform pressure and temperature. By substantially uniform is meant within about 10%. In one embodiment of the invention, the polymer has a Shore A hardness of less than about 15, typically less than 8, and desirably less than 1; the compressive strength is less than 1 MegaPascals (MPa), and desirably less than 0.2 MPa.

The ability of the inventive medium to flow under molding pressure is believed to be especially reflective of the properties of a good medium. This characteristic allows redistribution of the medium both within and to and from the vessel; it enables control of the absolute level and variability of the pressure. And tests show it is that which distinguishes the materials of the present mediums from those which have been used heretofore in the pressure pad molding technique. The flowability property can inferentially be seen to be analogous to viscosity. But there is no evident standard test known for measuring this property of importance to the invention and therefore a test apparatus was created as described above comprised of a cylinder having a downwardly movable piston to test the polymer portion of the medium. The cylinder is filled with the rubber or other medium being tested. A replaceable pipe extends from the side of the cylinder and discharges rubber onto a weighing scale, the weight being recorded as a function of time and the pressure applied to the rubber as measured by a transducer. The pipe is a smooth stainless steel tube of 1.1 cm inside diameter and nominally 32–64 RMS (root mean square) surface finish. The pipe length is chosen as desired, with 7.6 cm and 15.2 cm being preferred.

Thus, generally it can be said that the polymer will have flowability, i.e., mass transport can occur when molding pressures are applied. The preferred polymer, when tested in the apparatus described above using 10.3 MPa (1500 psi) and a 15.2 cm (6 inch) pipe, has a flow rate of at least 0.6 gram per second (g/s), typically 6 g/s, and desirably more than 25 g/s.

Further description of the polymer portion of the polymer/metal mixture is given below. A particulate elastomer is typically used in the practice of the invention. When the 8017 polymer is used as particulate solids, prior to the application of pressure the particulates are spaced apart at the article precursor surface. But when pressure is applied, the particles self-comply and coalesce into a continuous void-free body. With the addition of a eutectic alloy (or metal), the alloy fuses and conforms to the particle shape. Because of this and their inherent resilience, a uniform hydraulic-like pressure is applied to the article precursor surface. Tests show that the 8017 material without the metal additive will tend to coalesce upon the application of moderate compressive pressure, of the order of 70 kPa; at this point the interfacial boundaries between the particles are so essentially conformed that the compressed rubber becomes translucent instead of opaque. The 8017 material has a true density of 0.97 gram per cubic centimeter (g/cc), an apparent bulk density of 0.5 g/cc as a −30 mesh size powder, and it is compressed to a coalesced translucent material with a density of 0.94–0.97 g/cc by the application of about 70 kPa. (Further compression of captured material, in the range 70 kPa to 13.8 MPa, shows it to have about 0.4% volume change per 10 MPa.) Under the above-described coalesced condition, there is believed to be little void, or gas (except absorbed gas) contained in the interstices between the particulates.

Thus, the preferred polymeric material, when used in particulate form, will be self-compliant and will tend to coalesce as an apparent void-free body below a pressure of 350 kPa, preferably 240 kPa; more preferably about 69 kPa.

Based on various molding tests and material property measurement, desirable results have been associated with mediums having low strength, the ability to self-comply under molding level pressures, and the ability to flow and exhibit hydraulic-like behavior. The tendency toward friability has been observed and is believed associated with the flowability behavior. Other silicone rubbers than 6360 have been used up to the date of this application, and it is within contemplation that there are still other organic polymers and other materials which are either known or can be developed which will carry out the essential features of the invention. To characterize the desirable properties associated with the good molding results, comparative tests have been run on various rubbers, in molding trials on actual composite articles, in the flow test apparatus described, and in standard apparatus.

Tests run on the granular 8017 material showed a maximum variation in pressure of as low as 2% at about 6.9 MPa nominal pressure; other useful materials produced pressure uniform within 10%. Addition of molten metal matrices does not adversely affect the above-cited property.

The usefulness of the materials is also evaluated according to the integrity of a molded finished product, it being well established that inspection will commonly show areas of low density or cracking where the proper application of pressure and temperature has not been achieved, during either the heating or cooling cycle.

The polymer (and metal mixtures) have only been characterized according to the properties of some currently available materials; the data are insufficient to establish that the totality of measured properties in combination are necessary. On the contrary, to a significant extent it is believed there is a redundancy and that they independently characterize the invention.

It is no longer essential that there be a gas tight seal in vacuum bag even while substantially isostatic conditions are achieved. Instead, the small particulate blocks any small openings and will not infiltrate the composite. Generally, the presence and pressure of the particulate will aid in the sealing of the bag. And when, after a cycle involving high pressures, a polymer metal mixture is returned to its ambient atmospheric pressure, it is found that the particulates are insubstantially adhered to one another; they are easily removed from the vessel, such as by conventional vacuum means.

While it is desirable to introduce and reuse the more preferred polymers in the molding apparatus as a particulate, it is possible to introduce the materials partially or wholly as a large single solid. During molding, there can be movement of the medium within the vessel and ancillary equipment (when used). Such flow will tend to break up the medium into particles, as will any other repeated substantial deformation of the medium. Thus the phenomena associated with the use of particulates in the preferred mode will also be observed in the use of the singular solid mass.

The pressure vessel used can be virtually anything that can provide support and/or structural support to the medium and/or article. Thus, it can be a metal vessel (e.g. stainless steel, alloy steel) or even a vacuum bag in combination with a tool. In other words, the pressure vessel is an article(s) that contains the article to be molded.

While the invention has been described in terms of a closed vessel, it will be evident that the principles of the method of the invention will permit other variations. For instance, an article may be molded in situ; as when a lining is molded within a rocket motor case. And the invention may be used in other situations where there is not a closed vessel, per se, such as when the medium is captured in a die or tool cavity during compression molding. For example, an upper female die envelops a lower male die which has a cavity that receives and shapes the article precursor. Silicone rubber metal medium fills the space above the article precursor within the female die. When the opposing pistons move the dies together the medium volume is changed, it is thus pressurized, and the article is molded. Thus, generally, the invention will be applicable to diverse molding situations.

It is desirable that the vessel contain mainly the desired polymer metal medium and the article being molded. However, it will be appreciated that there will be allowed other objects, particles and materials to be contained within the medium. While the material is described as being essentially void-free during molding, such reference is to the absence of spaces between the molten metal and the individual pieces of the medium, and is not a limitation on such occasional voids as may be in the cast or formed polymer piece due to the nature of its manufacture.

The invention has been described in terms of the molding of a composite polymer material prepreg (e.g. conventional polyamide, polyimide, polybenzimidazole (PBI), bismaleimide (BMI) epoxy resins, and even polyetheretherketone and polysulfone resins, etc. filled with conventional glass fiber, graphite fiber etc.), but it should be evident that the invention will be equally applicable to the molding of other polymer materials, laminates, and to the processing of articles made of other materials, including metals (such as conventional powder metal preforms, e.g. aluminum) and ceramics. The term molding as used herein is intended to embrace all material processing in which pressure and heat is applied to the surface of the material (article precursor) resulting in a molded article.

The FIGURE illustrates a method and apparatus according to the present invention wherein an article precursor 1 such as a composite prepreg is placed in a pressure vessel 3 (e.g. alloy steel) and surrounded with a polymer medium metal mixture (medium) 6. The medium may be in contact with more or less of the article precursor as is desired. It is preferable to have a barrier layer 25 between the medium and the article to avoid contamination of the article and medium and a release fabric 26 so the barrier layer 25 doesn't adhere to the article. Unlike a vacuum bag, this layer does not have to be air tight. An exemplary barrier material is a conventional aluminum foil. The barrier layer can cover a glass fabric breather layer which is in communication with a vacuum line 40 via gas vent 31. This may be used to remove volatiles from the article. Typically, the surface area of the article precursor 1 not in contact with the medium is disposed (e.g. in contact) next to a tool 7 in order to provide (or maintain) a particular shape to the article 1. A pressurizer (e.g. mechanical piston) 9 can apply the requisite, uniformly distributed medium pressure to the article precursor. However, the pressure is preferably accomplished via the thermal expansion of the polymer medium 6. Such things as conventional pressure transducers 12 can be inserted in various places within the pressure vessel 3 to detect the requisite pressure. While any pressure can be used with the present invention, typically pressures up to 20.67 MegaPascals (MPa) (3000 pounds per square inch (psi)) are required for molding such things as composite materials.

Heating means 15 are used to form (e.g. cure, crystalize, anneal, etc.) the article to be molded 1. Direct heating of the article can also be accomplished by heating means 30 which is an induction coil. By raising the temperature of the metallized medium, the heat is transferred to the article that is disposed next to the medium. The heat transfer is advantageously increased by the incorporation of metal in the medium. It is not necessary for all the metal to be molten, but it is preferred that the metal disposed in close proximity to the article precursor is molten in order to facilitate the heat transfer without adding rigidity or structure to the medium. By close proximity is meant within about 2.5 cm or 5 cm. This can occur when there is a heating element 15 contained in close proximity to the article and designed to provide heat to the article to be molded. Thus, the medium in close proximity to the article (e.g. within about 2.5 cm or 5 cm) will be heated and the metal melted but the metal farther away may not melt. The particular metals of this invention do not detract from the flowable nature of the polymer since they are molten at the molding temperatures used. Preferably, a second heat transfer coil 18 such as a steam line is used to change the pressure via the large thermal expansion of the pressurizing medium. Typically, the temperature used to expand the pressurizing medium is much less than that used to cure the article precursor. Thus tubing 18 can be used alternately to heat or cool the medium depending on whether hot or cool fluids are passed through the tubing. Regulation of this pressure change can be achieved through a relief valve 21, piston 9 and/or fluid heating/cooling means 18.

EXAMPLE

A prepreg containing 45% by weight polybenzimidazole (PBI) resin available from Acurex (Mountainview, Calif.) and 55% by weight Thornel T-300 ™ graphite fibers available from Union Carbide (Danbury, Conn.) is laid-up and debulked on a suitable mandrel (mold). The article is covered with one layer of Teflon ™ (E. I. DuPont De Nemours, Wilmington, Del.) coated glass Armalon ™ fabric available from T.M.I. Inc. (Salt Lake City, Utah) and one layer of glass "bleeder" fabric Style #1581 fabric (T.M.I.) in communication with a vacuum vent. A layer of aluminum foil 0.0177 thick (0.0007 inch) is placed over the glass fabric, stopping short of the vent. Then a second layer of glass fabric is placed over the aluminum foil and vent to form a "breather" layer. A final covering of three layers of aluminum foil is placed over the assembly and taped to the mandrel.

The prepared mold assembly is placed into a pressure vessel (mold) for processing. The vessel is then closed, a mixture comprising 75% metal alloy (63% tin, 37% lead) and 25% 8017 process medium introduced, and the cure cycle started. Heating is provided to the mold to properly cure the article. A second heating source is installed in close proximity to the part after installation of the part and mold assembly in the vessel. Heating and cooling are also provided to a control coil to maintain the desired pressure conditions.

During the cure, a five-step temperature cycle is followed to properly advance and cure the PBI resin to obtain optimum physical/mechanical properties. Improper heating during the early part of the cure can result in excessive resin bleeding and starvation. The outer coil is maintained at temperatures that result in the pressures described above through the thermal expansion of the polymer. Pressure transducers supply the desired pressure information. The following cycle is employed:

| Time (Minutes) | Temperature (°C.) | Pressure |
| --- | --- | --- |
| 0–60 | 191 | 0.17 MPa (25 psi) |
| 60–75 | 232 | Increasing pressure to 9.65 MPa |
| 75–90 | 232 | 9.65 MPa (1400 psi) |
| 90–120 | 288 | 9.65 MPa (1400 psi) |
| 120–180 | 371 | 9.65 MPa (1400 psi) |
| 180–300 | 468 | 9.65 MPa (1400 psi) |

Stepped cycles are also used for vacuum and medium (isostatic) pressure. Vacuum pressure is controlled in the breather layer at between 125–380 mm (5–15 in. Hg) during the early part of the cure. This partial vacuum is required to aid in removal of condensation volatiles, without removal of reactive monomers. Vacuum is then increased to about 660–760 mm (26 to about 30 in. Hg) when the part temperature is above 149° C. (300° F.). Molding pressure is also increased to 9.65 MPa (1400 psi) at this time. It is necessary to avoid excessive pressure before the resin viscosity has increased sufficiently to prevent excessive bleedout.

Both vacuum and molding pressure are continued after the final cure step is complete. The molding pressure is maintained until the part temperature is below 121° C. to 149° C. at which time the metal will have solidified but is easily crumbled into free flowing lumps. Vacuum and medium pressure are discontinued at that time.

The pressure vessel is opened (when cool enough to handle) and the powdered medium is removed by an industrial vacuum cleaner or other pneumatic transport system. The article and tool are removed and the exterior surfaces cleaned with the vacuum. After removal of the aluminum foil barrier, the part is sent to the next operation (i.e. machining, flash removal, cleaning and bonding).

This process is especially suited for molding articles that cannot practically be heated by form tooling. The high heat transfer through the molten metal medium permits heating of the mass by locally placed heat sources.

The present invention enables particularly good control over the pressure and temperature to which the article is subjected. In addition, since the medium contains particulate metal, the heat transfer properties are improved without any loss of flow properties. Because the medium is a solid, the article being molded need not be sealed in a manner which is impervious to gas or liquid, greatly alleviating problems with prior art methods such as bagging. The articles produced are considerably more uniform in properties, especially when of complex shape, compared to articles produced by the prior art method, for example.

The metal matrix reduces thermal cycle times thereby reducing damage due to exposure to heat and pressure. Its high thermal conductivity improves the heating of complex shapes and also reduces the need for internally heated tooling to heat the composite prepreg. The metal matrix improves the flowability of the dry fluid polymer media. Finally, lower metal contents can be used to obtain the same conductivity as non-melting metals due to continuous metal contact around the polymer particle. Thus, this invention makes a significant advance in the aerospace industry by providing methods of molding at elevated temperatures and pressures.

It should be understood that the invention is not limited to the particular embodiment shown and described herein, but that various changes and modifications may be made without departing from the spirit or scope of this concept as defined by the following claims.

I claim:

1. A polymeric material particularly adapted for use in a high pressure, elevated temperature molding process comprising a substantially uniform mixture of
   (a) about 20% to about 90% solid, flowable, particulate silicone rubber having a nominal flow rate of at least 0.6 gram/second through a 1.1 cm diameter pipe 7.6 cm long under applied pressure of 10.34 MPa at room temperature; and
   (b) about 10% to about 80% thermally conductive particulate metal
      (1) having a melting point less than about said molding temperature;
      (2) substantially chemically compatible with said silicone rubber; and
      (3) having a size less than about 0.5 mm;
   resulting in a thermally conductive flowable pressurizing medium.

2. The polymeric material particularly adapted for molding as recited in claim 1 wherein said particulate metal is about 0.005 mm to about 0.5 mm in size.

3. The polymeric material particularly adapted for molding as recited in claim 1 wherein said particulate metal comprises eutectic alloys.

4. The polymeric material particularly adapted for molding as recited in claim 1 wherein said particulate metal comprises lead, tin, zinc, bismuth or a mixture thereof.

* * * * *